Oct. 28, 1952     C. E. WOLFORD     2,615,763
LEAKLESS LOW FRICTION BEARING
Filed Dec. 27, 1948
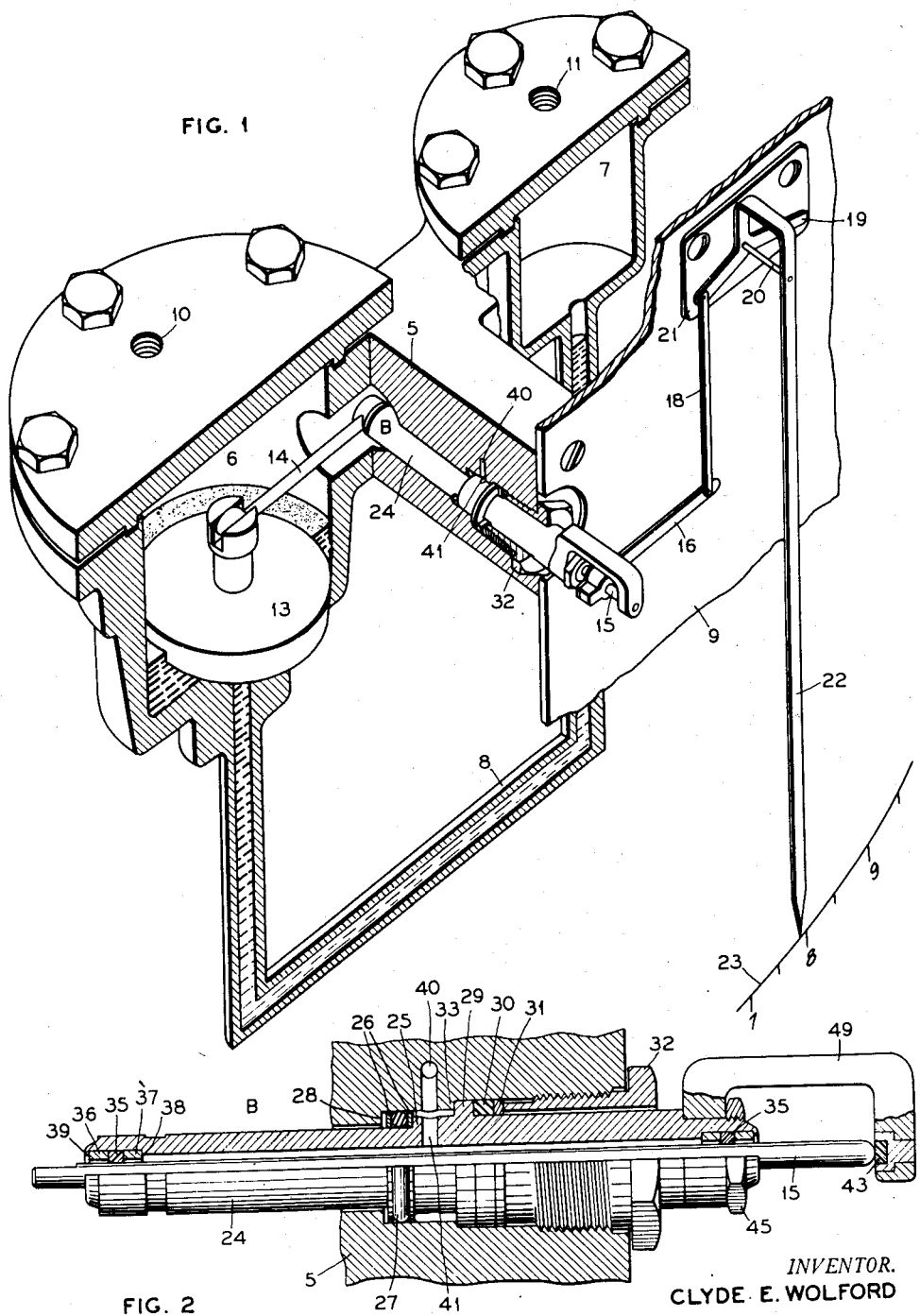
INVENTOR.
CLYDE E. WOLFORD
BY
D. Clyde Jones
ATTORNEY Patented Oct. 28, 1952

2,615,763

UNITED STATES PATENT OFFICE 2,615,763

LEAKLESS LOW FRICTION BEARING

Clyde E. Wolford, Rochester, N. Y., assignor to Taylor Instrument Companies, Rochester, N. Y., a corporation of New York Application December 27, 1948, Serial No. 67,279

8 Claims. (Cl. 308—36.1)

This invention relates to a substantially leakless, low friction bearing unit, adapted for a wide variety of uses, such as in manometers which are suited for measuring differential pressures.

Such a bearing unit must be substantially leakless without introducing appreciable friction such as would arise if ordinary stuffing boxes were utilized.

The various features and advantages of the invention will appear from the detailed description and claims when taken with the drawings in which Fig. 1 is an isometric view partially in section of a mecury manometer incorporating the leakless, low friction bearing unit of the present invention; and Fig. 2 is a side elevation of the bearing unit of the present invention shown in partial longitudinal section.

Referring to Fig. 1 the numeral 5 designates a portion of the housing of a mercury manometer or the like. The manometer comprises a sealed float chamber 6 and a second sealed chamber 7 which communicates with the float chamber through a U-tube 8. In the manometer shown, the U-tube and at least the lower portion of the float chamber 6 are filled with mercury or the like. The top of the float chamber 6 is provided with an inlet opening 10 and the top of the chamber 7 is provided with an inlet opening 11 through which fluids at two different pressures are respectively supplied, in order to determine the differential pressure therebetween. It will be understood that the fluid at the higher pressure will be introduced into the chamber 7.

The float chamber 6 has mounted therein a float 13. This float is supported by the mercury in the float chamber so that the float rises and falls as the level of the mercury changes in response to pressure changes taking place in the fluids introduced into the two chambers. The top of the float has pivotally connected thereto one end of a float arm 14, the other end of which is secured to a take-off shaft 15 (Fig. 2) extending at right angles thereto. This take-off shaft passes through the leakless bearing unit B of the present invention which extends in sealed relation through an opening in the housing 5 of the manometer. The forward end of the take-off shaft (Fig. 1) has secured thereto a take-off lever 16 extending at right angles to the shaft. The free end of the take-off lever is connected by a link 18 to a yoke 19 which is pivotally mounted at 20 on a plate 21 in turn attached to the closure 9 of the housing 5. As herein illustrated, the yoke carries an index 22 adapted to swing over a graduated scale 23 to indicate the prevailing differential pressure. It will be understood of course, that if a record is to be made, the index and scale can be replaced by a well-known pen or stylus and a clock-driven recording chart.

The bearing unit B which is shown enlarged in Fig. 2, comprises a sleeve 24 provided with an external peripheral shoulder 25. The shoulder 25 in cooperation with an internal peripheral shoulder 28 formed around the opening through the wall 5 retains the synthetic rubber O-ring 27 between the metal washers 26. The O-ring 27 and the washers 26 fit snugly between the shoulders 25 and 28 but the O-ring is not compressed by these shoulders. Instead the O-ring seals by deformation on the application of pressure to either side thereof rather than by compression. The sleeve 24 is also provided with a step 29, adapted to be engaged by a synthetic rubber packing ring 30 which is backed by a metal washer 31. A packing nut 32, screwed into the threaded opening in wall 5, engages the washer 31 to force the packing ring against the right hand surface of step 29. When the packing nut 32 is tightened, the left hand surface of step 29 engages the internal peripheral shoulder 33 at the opening in the wall 5. The construction just described insures a complete seal between the sleeve 24 and the wall 5 of the instrument housing.

The surface of the take-off shaft 15 is polished to a microfinish wherein the surface variation thereof preferably does not deviate more than two or three millionths of an inch. Within each end of the sleeve 24 there is provided a bushing 35 made of plastic material having an opening therein of a diameter which is initially slightly smaller than the diameter of the shaft 15 which passes therethrough. In other words, there is an interference fit between the shaft and the bushing. The bushing 35 is snugly mounted between two metal shrouding rings 36 and 37, the ring 37 being arranged to engage a shoulder 38 formed in the inner wall of the sleeve 24 and the metal ring 36 being fixed snugly against the bushing 35 by having the end 39 of the sleeve spun thereover. The plastic material should be a tough waxy solid which is highly resistant to abrasion and which will withstand temperatures in the range between —50° F. to + 500° F. without physical changes therein. It must be inert to chemicals encountered in service. A plastic material which has been found suitable for this purpose is polytetrafluoroethylene (also known as "Teflon").

The clearance or annular space between the shrouding rings 36 and 37 and the shaft 15 is kept as small as practicable without contact therebetween. This small clearance prevents cold flow of the "Teflon" bushing away from the shaft since this bushing is held against radial displacement from the shaft and consequent lateral displacement thereof along the shaft. It should be mentioned that the two "Teflon" bushings 35 should be so constructed and mounted that the openings therethrough are in exact alinement with each other and are exactly concentric with the shaft 15 passing therethrough. The thickness of the "Teflon" bushing is greatly reduced as compared with the thickness of the usual metal bushings used for this purpose. In fact, the thickness of the "Teflon" bushing is greatly reduced as compared to the diameter of the shaft 15.

In the space between the sleeve 24 and the takeoff shaft 15 as limited by the two "Teflon" bushings 35, there is a filling of a viscous sealing liquid (not shown), preferably under pressure. The sealing liquid should have low internal friction and sufficient body to prevent leakage between the bushings and the shaft and at the same time should have high resistance to chemical attack. A sealing liquid suitable for this purpose is one of the silicone greases. This liquid can be introduced under pressure into the mentioned space, from a suitable lubricator (not shown), through a duct 40 in housing wall and through the opening 41 in the sleeve 24.

It has been discovered that a coupling made in the manner just described and filled with the mentioned viscous liquid provides a substantially leakless bearing with an extremely low amount of friction therein which coupling maintains these properties over long periods of service.

The right hand end of the take-off shaft 15 (Fig. 2) is rounded as shown and engages a jewel or thrust bearing 43. This jewel is carried by a bracket 49 which is locked on the right hand end of the sleeve, by means of a lock unit 45 threaded on the last-mentioned end of the sleeve.

While the present bearing unit has been specifically illustrated in connection with a manometer, it will be understood that it can be used in any place where it is desirable to change an angular motion into a rotary motion of a shaft extending through the wall of a sealed chamber which is subjected to high static pressures. Although the bearing unit is preferably made with two "Teflon" bushings, it can be made with one "Teflon" bushing and one metal bushing or even with a single "Teflon" bushing.

What I claim is:

1. In combination, a rotatable shaft circular in cross section and having a microfinished surface, and a bearing in which said shaft rotates, said bearing comprising a sleeve, an apertured washer-like bushing of relatively inert waxy plastic material mounted in the sleeve with the periphery of the bushing in snug engagement with the inner surface of said sleeve and with the principal plane of the bushing extending at right angles to the main axis of said sleeve, shrouding rings to receive said shaft therethrough and snugly contacting the respective flat surfaces of the bushing, each shrouding ring having its periphery contacting the inner surface of said sleeve, the shrouding rings being out of contact with said shaft with but a limited clearance therebetween, the aperture through the bushing being circular to receive said shaft for rotation therein and having a diameter of approximately the diameter of said shaft whereby there is a close fit between the bushing and said shaft.

2. In combination, a rotatable shaft circular in cross section and having a microfinished surface, and a bearing in which said shaft rotates, said bearing comprising an elongated sleeve, an apertured washer-like bushing of relatively inert waxy plastic material mounted in each end of the sleeve with the periphery of each bushing being in snug engagement with the inner surface of said sleeve and with the principal plane of each bushing extending at right angles to the long axis of said sleeve, a pair of shrouding rings to receive said shaft therethrough and snugly contacting the respective flat surfaces of each bushing, each shrouding ring having its periphery contacting the inner surface of said sleeve, the shrouding rings being out of contact with said shaft with but a limited clearance therebetween, the apertures in said bushings being in accurate alinement with each other to receive said shaft therethrough, said shaft being rotatable in said bushings, the aperture through each bushing being circular and having a diameter slightly less than the diameter of said shaft whereby there is an interference fit between the bushings and said shaft.

3. In combination, a rotatable shaft circular in cross section and having a microfinished surface, and a bearing in which said shaft rotates, said bearing comprising an elongated sleeve, an apertured washer-like bushing of relatively inert waxy plastic material mounted in each end of the sleeve with the periphery of each bushing being in snug engagement with the inner surface of said sleeve and with the principal plane of each bushing extending at right angles to the long axis of said sleeve, and a pair of shrouding rings to receive said shaft therethrough and snugly contacting the respective flat surfaces of each bushing, each shrouding ring having its periphery contacting the inner surface of said sleeve, the shrouding rings being out of contact with said shaft with but a limited clearance therebetween, the apertures in said bushings being in accurate alinement with each other to receive said shaft therethrough, said shaft being rotatable in said bushings, the aperture through each bushing being circular and having a diameter approximately equal to the diameter of said shaft whereby there is a close fit between the bushings and said shaft, and a relatively inert grease filling the space between the sleeve, the shaft and said bushings.

4. In combination, a rotatable shaft circular in cross section and having a microfinished surface, and a bearing in which said shaft rotates, said bearing comprising an elongated sleeve having a peripheral, internal shoulder near each end thereof, an apertured washer-like bushing of relatively inert waxy plastic material snugly mounted in each end of the sleeve with the periphery of each bushing being in snug engagement with the inner surface of said sleeve and with the principal plane of each bushing extending at right angles to the long axis of said sleeve, a pair of shrouding rings to receive said shaft therethrough and snugly contacting the respective flat surfaces of each bushing, each pair of shrouding rings with their intervening bushing being clamped against one of said shoulders by the spun-over, adjacent end of said sleeve, each shrouding ring having its periphery contacting the inner surface of said sleeve, the shrouding rings being out of contact with said shaft with but a limited clearance therebetween, the apertures in said bushings being in accurate alinement with each other to receive said shaft therethrough, said shaft and said bushings being capable of relative rotation, the aperture through each bushing being circular and having a diameter approximately equal to the diameter of said shaft whereby there is a close fit between the bushings and said shaft.

5. In combination, a rotatable shaft circular in cross section and having a smooth surface, and a bearing in which said shaft rotates, said bearing comprising a sleeve, an apertured washer-like bushing of relatively inert waxy plastic material securely mounted in the sleeve with the principal plane of the bushing extending at right angles to the main axis of said sleeve, metal shrouding ring means to receive said shaft therethrough without contact with the shaft and snugly contacting the respective flat surfaces of the bushing, said shrouding ring means substantially sealing said bushing to the inner surface of said sleeve, the aperture through the bushing being circular to receive said shaft and having a diameter approximating the diameter of said shaft whereby there is a close fit between the bushing and said shaft.

6. In combination, a rotatable shaft circular in cross section and having a smooth surface, and a bearing in which said shaft rotates, said bearing comprising a sleeve, an apertured bushing of relatively inert waxy plastic material securely mounted in the sleeve to receive said shaft therethrough, the aperture in the bushing alined with the principal axes of said shaft and of said sleeve, metal shrouding means receiving said shaft therethrough with a loose fit serving to confine the periphery of the bushing and to compress the respective end surfaces of the bushing toward each other, said shrouding means substantially sealing said bushing to said sleeve, the aperture through the bushing being circular to receive said shaft and having a diameter approximating the diameter of said shaft whereby there is a close fit between the bushing and said shaft.

7. In combination, a shaft circular in cross section and having a smooth surface, and a bearing in which said shaft rotates, said bearing comprising a sleeve, means closing said sleeve including an apertured washer-like bushing of plastic material and a shrouding ring unit mounted in each end of the sleeve with the apertures in the bushings in accurate alinement with each other to receive said shaft therethrough, the aperture through each bushing being circular and having a diameter closely approximating the diameter of said shaft whereby there is a close fit between the bushings and the shaft, said plastic material being a tough, waxy solid such as polytetrafluoroethylene which is highly resistant to abrasion and which will withstand temperatures in the range substantially below freezing to well above the boiling point of water without physical change therein and which is relatively inert to chemicals which it encounters in service, said shrouding ring unit engaging substantially the entire flat side surfaces of said bushing to limit cold flow of said material but being out of contact with said shaft.

8. In combination, a rotatable shaft circular in cross section and having a smooth surface, and a bearing in which said shaft rotates, said bearing comprising an elongated sleeve having a peripheral shoulder near each end thereof, an apertured washer-like bushing of relatively inert waxy plastic material securely mounted in each end of the sleeve with the principal plane of each bushing extending at right angles to the long axis of said sleeve, a pair of shrouding rings to receive said shaft therethrough and snugly contacting the respective flat surfaces of each bushing, each pair of shrouding rings being clamped between one of said shoulders and the spun over adjacent end of said sleeve, the shrouding rings being out of contact with said shaft with but a limited clearance therebetween, the apertures in said bushings being in accurate alinement with each other to rotatably receive said shaft therethrough, the aperture through each bushing being circular and having a diameter approximately equal to the diameter of said shaft whereby there is close fit between the bushings and said shaft.

CLYDE E. WOLFORD.

REFERENCES CITED

The following references are of record in the file of this patent:

UNITED STATES PATENTS

| Number | Name | Date |
| --- | --- | --- |
| 1,362,039 | Porteous | Dec. 14, 1920 |
| 1,733,416 | Lebesnerois | Oct. 29, 1929 |
| 1,879,774 | Temple | Sept. 27, 1932 |
| 2,034,227 | Colwell | Mar. 17, 1936 |
| 2,356,027 | Boyd | Aug. 15, 1944 |
| 2,388,129 | Eisenbeis | Oct. 30, 1945 |
| 2,393,967 | Brubaker | Feb. 5, 1946 |
| 2,442,919 | Conhagen | June 8, 1948 |
| 2,450,221 | Ashburn | Sept. 28, 1948 |